Figure 1:
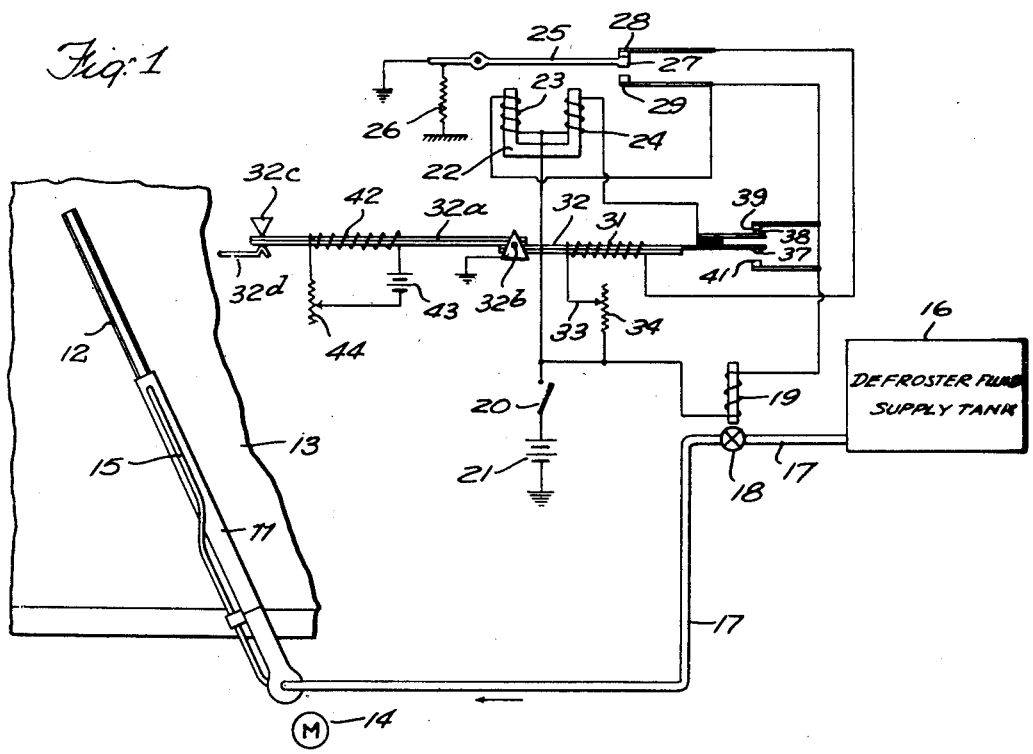

March 28, 1950

T. J. SMULSKI 2,502,180

TIMING MECHANISM FOR FLUID
APPLYING WINDSHIELD WIPERS

Filed Oct. 21, 1944

INVENTOR
THEODORE J. SMULSKI

BY
Moses, Nolte, Crews + Berry
ATTORNEYS

Patented Mar. 28, 1950

2,502,180

UNITED STATES PATENT OFFICE 2,502,180

TIMING MECHANISM FOR FLUID APPLYING WINDSHIELD WIPERS

Theodore J. Smulski, Gary, Ind., assignor to Productive Inventions, Inc., a corporation of Indiana Application October 21, 1944, Serial No. 559,857

9 Claims. (Cl. 15—250.4)

1

My invention relates to the timing of intermittently operated work devices, and more particularly to a system for controlling the intermittent supply of a cleaning, defrosting, or deicing fluid to a windshield wiper.

Heretofore numerous windshield wipers have been designed to apply a cleaning, defrosting or deicing fluid to a windshield. Substantially all of these devices have been designed for use in connection with automobiles or marine craft, but such devices are not suitable for use with high-speed vehicles such as airplanes. More recently windshield wiper cleaners supplying a fluid have been constructed for aircraft. Such cleaners differ greatly from those previously designed for land or marine craft because of various factors which are of importance in aircraft windshield cleaners.

For example the speed of oscillation of a windshield wiper on an aircraft may be in the vicinity of four to five hundred strokes per minute which is many times the maximum speed of operation of windshield wipers suitable for land and marine craft. The air pressure encountered on a windshield in an aircraft is also many times greater thus requiring a wiper motor of greater power, a wiper arm of greater spring pressure and, where fluid is conducted to the windshield it must be conducted directly adjacent the wiper blade so that it may be spread over the surface to be wiped.

The conservation of deicing fluid is one of the primary factors in the construction of airplane windshield wipers, since it is important to keep down the weight of the supply of deicing fluid while maintaining the supply adequate for long distance flights. In supplying defrosting or deicing fluid to an aircraft windshield wiper blade it has been found advantageous to provide some means whereby the fluid is intermittently supplied thereby conserving the fluid and yet issuing a positive flow of fluid to the windshield. In accordance with my invention I provide a windshield wiper defroster supply system whereby defroster fluid supplied thereby may be controlled or adjusted. Furthermore means are also provided for selectively adjusting the duration of the periods during which fluid is supplied to the windshield.

It is therefore an object of my invention to provide an improved windshield wiper system which will overcome certain of the above mentioned disadvantages of the prior art.

Another object of my invention is to provide an improved windshield wiping system wherein defrosting fluid is intermittently supplied to a windshield and whereby the time interval between periods during which fluid is supplied may be varied.

Still another object of my invention is to provide an improved defrosting windshield wiper system wherein the duration of the periods during which defrosting fluid is supplied to a windshield may be controlled.

A still further object of my invention is to provide a controlling device having two different operating periods each of which may be controlled.

The present application contains claims readable upon the disclosure in part of my co-pending application now abandoned, Serial No. 470,034 filed December 24, 1942 for Defrosting systems, and is entitled to the benefit of said filing date for such claims.

Figure 2:
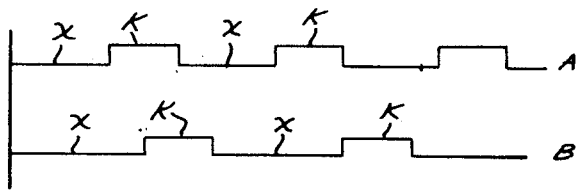
Figure 3:
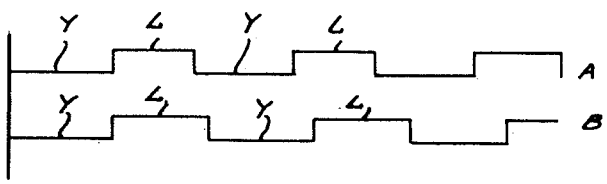
Figure 4:
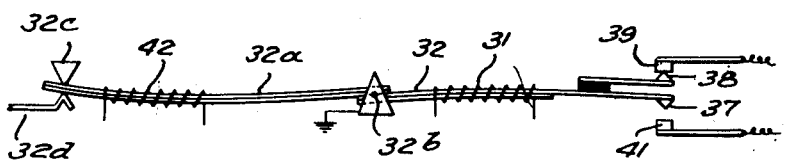

Other and further objects of my invention will become more readily apparent by reference to the following description taken in connection with the accompanying drawing wherein Figure 1 diagrammatically illustrates a windshield wiper system embodying the present invention; Figures 2 and 3 are graphic representations illustrating certain operational characteristics of the device shown in Figure 1; and Figure 4 is a fragmentary view of a part of the structure shown in Figure 1.

Referring more particularly to Fig. 1 there is shown a windshield wiper arm 11 and a windshield wiper blade 12 operatively related to a windshield 13. The windshield wiper arm 11 and the blade 12 are actuated by a suitable actuating mechanism or motor 14. The blade and arm are preferably of the type wherein the defrosting fluid is conducted by means of a conduit 15 on the arm to the channel of the wiper blade 12 which is provided with suitable apertures so as to direct the defrosting fluid to the windshield at the proper angle adjacent the flexible wiper element of the blade. A windshield wiper arm and blade of this type is shown in my corresponding patent application Serial No. 401,951, filed July 11, 1941 now Patent No. 2,348,502, May 9, 1944. A supply of defrosting fluid is provided by a tank 16 which is connected through a conduit 17 and a valve 18 to the conduit 15 of the wiper arm 11. The valve 18 is controlled by a mechanism whereby the interval between the periods during which the valve permits fluid to be supplied to the windshield may be controlled and also means whereby the duration of the fluid conducting periods may be varied.

A suitable apparatus for actuating the valve 18 so as to determine the time intervals or periods during which fluid is permitted to flow to the windshield 13 may comprise a work device or solenoid 19 for actuating the valve 18, together with other electric circuit elements. The electric circuit for energizing the solenoid 19 includes a source of potential 21, one terminal of which is connected to the ground. The other terminal of the source of potential 21 is connected to the common juncture of two coils of a relay 22 having coils 23 and 24. The relay 22 is provided with an armature 25 which is biased by a spring 26 to the position as shown in the drawing. The armature 25 is connected to ground and at one end supports a contact 27 which in the position shown engages a contact 28. When the armature 25 is attracted by the relay 22 the contact 27 engages a contact 29. The contact 28 is connected to a heating coil 31 which surrounds a bimetallic element 32, and the heating coil 31 is connected to an adjustable contact 33 on a resistor 34, one terminal of which is connected to the ungrounded side of the source of potential 21.

The bimetallic element 32 is rigidly secured at one end to the overlapping end of adjoining bimetallic element 32a. The composite element formed by the elements 32 and 32a is pivotally supported on a pivot pin 32b, while the other end of the element 32a is pressed against a stationary abutment 32c by a spring 32d. The elements 32 and 32a may be alike in construction save that one of them responds to increase of temperature by bending in one direction while the other responds to increase of temperature by bending in the opposite direction. For example, the element 32 as shown in Fig. 1 will be rendered concave on its lower side by a rise of temperature, while the element 32a as shown in Fig. 1 will be rendered concave on its upper side by a rise of temperature. The bimetallic element 32 is connected to ground, and at one end is electrically connected to a contact 37. The contact 37 is substantially rigidly supported from the adjacent end of element 32. The bimetallic element 32 also rigidly supports a contact 38 which is suitably insulated from the bimetallic element and the contact 37. The contact 38 is normally in contact with contact 39, and the contact 37 is adapted to be moved to engage a contact 41. The contact 38 is connected to the other terminal of the relay coil 24 of the relay 22. The contact 39 which normally is in engagement with the contact 38 is connected to the contact 29 and to the other terminal of the relay coil 23 of the relay 22. The contacts 29 and 39 are also connected to the contact 41 and through the solenoid 19 to the undergrounded side of the source of potential 21. The arrangement thus far described constitutes an apparatus for fluid to be supplied to the windshield for predetermined time intervals and by adjustment of the contact 33 on the resistor 34 the time intervals between these periods may be varied.

Around the element 32a there is provided a heating coil 42 connected in circuit with a source of energy 43 and an adjustable resistor 44. As will become apparent subsequently the heating coil 42, the source of energy 43 and the adjustable resistor 44 operate to change the duration of the periods during which fluid is supplied to the windshield wiper arm and blade.

The operation of the above apparatus will now be described. The armature 25 of the relay 22 is normally in the position shown since it is biased to this position by the spring 26 so that the contacts 27 and 28 are closed. It will now be assumed that the switch 20 has been closed so as to supply energy from the source 21 to the circuit shown. Current will now flow from the switch 20 through the resistor 34, the heating coil 31, the contacts 28 and 27 back to ground thus supplying energy to heat the bimetallic element 32. After current has been flowing through the heating element for a time interval sufficient to heat the bimetallic element 32, the contacts 38 and 39 will be separated and the contacts 37 and 41 will be closed. Since the contact 37 is connected through the bimetallic element 32 to ground, a circuit may now be traced from ground through contacts 37 and 41, through solenoid 19 to the ungrounded side of the source of potential 21. Another circuit may also be traced from ground through the bimetallic element 32, the contacts 37 and 41, the coil 23 of the relay 22 to the ungrounded side of the source of potential 21. This causes the armature 25 of the relay 22 to be attracted so as to open contacts 27 and 28 and to close contacts 27 and 29. The closing of the contacts 27 and 29 locks in the relay 22 since a circuit may now also be traced from ground through contacts 27 and 29 through the coil 23 to the switch 20 and the ungrounded side of a source of potential 21. The opening of contacts 27 and 28 interrupts the circuit through the heating element 31 of the bimetallic element 32 so that this element begins to cool thereby eventually opening contacts 37 and 41, and closing contacts 38 and 39. When the contacts 38 and 39 are closed a circuit is completed which may be traced from the source of potential 21 and the switch 20, the electromagnet coil 24 of the relay 22, the contacts 38 and 39, and the contacts 27 and 29 of the armature 25 back to ground, since it will be remembered that the armature 25 was also locked into the position when the coil 23 of the relay 22 was locked in. The energization of the coil 24 is in opposition to the force asserted by the coil 23 so that now the spring 26 may actuate the armature 25 to the position originally shown in the drawing. When the armature 25 is actuated so as to interrupt the contacts 27 and 28, the circuits through both of the coils 23 and 24 of the relay 22 are interrupted, thus placing the apparatus in condition for another cycle of operation.

The adjustment of the movable contact on the resistor 34 will vary the rate of heating bimetallic element 32 and hence will vary the time required for heating the bimetallic element 32. The heating periods coincide with the non-operating periods, and hence the intervals between supply periods are adjusted and controlled by adjusting contact 33.

The bimetallic element 32a provides ambient temperature compensation. If heat is supplied to bimetallic element 32a by means such as the coil 42 which is energized through a variable resistor 44 from the source of potential 43, it will operate to control the duration of the time interval for which or during which the solenoid 19 is energized to actuate the valve 18.

The influence of heater 42 and bimetallic element 32a upon the operation of solenoid 19 may be explained as follows:

The heater 42 may be adjusted to supply heat to the bimetallic element 32a at any desired rate. The bimetallic element 32a will be maintained at a substantially constant temperature, the temperature being governed by the rate at which heat is supplied. The temperature at which element 32a is maintained determines the rate of cooling of bimetallic element 32, as will now be explained.

As an example, let us assume a bimetal cantilever heated to quite a high temperature. When heating is suddenly discontinued the bimetal will move in the opposite direction, first very rapidly, then slower and slower as the bimetal temperature approaches the ambient temperature.

It is evident from an examination of Fig. 1 that the range of movement of contacts 37 and 38 from the time when bimetal 32 begins to cool to the time when it begins to be heated again is constant. It is clear then that if the operating range of the bimetallic element is high say between 100° and 200° above the ambient temperature, the time required for the contacts to move the prescribed distance in response to cooling will be shorter than if the operating range of the element were low, say between 20° and 120° above the ambient temperature.

As the bimetallic element 32a is heated to higher and higher temperature it bends more and more, pressing the contact 38 harder and harder against contact 39. This produces mechanical distortion of the bimetallic elements 32 and 32a. The element 32 must then be heated to a high enough temperature to cause the heat produced distortion of the element 32 completely to relieve the mechanical strain before contact 38 can be carried out of engagement with contact 39 by further heat produced distortion. When the element 32a is heated but slightly the temperature of 32 at which contacts 38 and 39 will become disengaged may be only 20° above the ambient perature of 32 at which contacts 38 and 39 will to a substantially higher temperature the temperature of 32 at which contacts 38 and 39 will become disengaged may be 100° above the ambient temperature. In either case the further rise of temperature of element 32 which will be required to engage contact 37 with contact 41 will be substantially the same. In the former instance, therefore, the element operates in a relatively low temperature range and in the latter instance it operates in a relatively high temperature range. In both instances the extent of the operative temperature range is the same. The figures used above are, of course, illustrative only.

The circuit of the heater 42 may of course be provided with a manually operable switch (not shown) and this switch may be mechanically coupled with the switch 20, if desired, to cause the switches to be opened and closed simultaneously.

The heater 42 also has an influence upon the length of time required for heating the element 32 through its operative temperature range. Unwanted variations may be compensated, however, by adjustment of the contact 33.

The operation obtained by moving the contact 33 on the resistor 34 which controls the length of the time interval between periods during which fluid is conducted is shown by comparison between the graphs A and B of Fig. 2 wherein the interval X is the time interval which may be varied and the interval K is the period during which the solenoid 19 is energized to open the valve 18. Thus it will be seen that the duration of the line X may be varied by changing the heating time of the bimetallic element 32 as heated by the coil 31.

By comparing the graphs A and B of Fig. 3 it will be seen that the intervals Y in the two graphs are the same whereas the cooling or conductive periods L have been changed. This change is brought about by adjusting the value of the resistor 44 which is in circuit between the source of energy 43 and the heating coil 42 which is placed about the ambient temperature compensating portion of the bimetallic element 32.

While the control device shown in Fig. 1 for determining the operation of the valve 18 is shown as applied to a windshield wiping system, it will be appreciated that a circuit may also be used for other controlling operations.

I have described what I believe to be the best embodiments of my invention. I do not wish, however, to be confined to the embodiments shown, but what I desire to cover by Letters Patent is set forth in the appended claims.

I claim:

1. The combination comprising a windshield wiper blade, means for actuating the wiper blade, a source of fluid, a discharge controlling valve, and continuously cyclically operating means for automatically periodically actuating said valve independently of the speed of actuation of said blade to enable fluid to be delivered intermittently to the windshield comprising electro-responsive means for operating said valve, an electric circuit for said electro-responsive means including a thermally responsive element having electric contacts arranged to control the flow of power through said electro-responsive means, electric heating means for said thermally responsive element, and means settable to control the flow of power intermittently through said heating means to vary the time intervals during which the valve is closed and open.

2. The combination comprising a windshield wiper having a wiper blade, means for actuating the wiper blade, a source of fluid, a discharge controlling valve, and continuously cyclically operating means for automatically, periodically actuating said valve independently of the speed of actuation of said blade to enable fluid to be delivered intermittently to the windshield comprising electro-responsive means for opening and closing said valve, electric circuit means for said electro-responsive means including a source of power, a thermally responsive element having electric contacts arranged to control the flow of power from said source through said electro-responsive means, electric heating means for said element arranged to be intermittently energized from said source of power, means settable to select and determine the heating time of said element, and additional means settable for varying the cooling time of said element.

3. The combination comprising a windshield wiper having a wiper blade, means for actuating the wiper blade, a source of fluid, a discharge controlling valve, and continuously cyclically operating means for automatically, periodically actuating said valve independently of the speed of actuation of said blade to enable fluid to be delivered intermittently to the windshield comprising electro-responsive means for opening and closing said valve, an electric circuit for said electro-responsive means including a source of power, a thermally responsive element having electric contacts arranged to control the flow of power from said source through said electro-responsive means, electric heating means for said element arranged to be intermittently energized from said source of power, means settable to select and determine the cooling time of said element, and additional means settable for varying the heating time of said element.

4. The combination comprising a windshield wiper blade, means for operating the wiper blade, a source of fluid, a discharge controlling valve, continuously cyclically operating electric means for automatically, periodically actuating said valve independently of the speed of operation of said blade to enable fluid to be delivered intermittently to the windshield, an electric circuit for energizing said means including a thermally responsive element having a pair of electric contacts arranged to control the flow of power therethrough, electric heating means for said thermally responsive element, and means settable to control the flow of power through said heating means to independently vary the time intervals during which the valve is closed and open.

5. The combination comprising a windshield having a wiper blade, means for operating the wiper blade, a source of fluid, a discharge controlling valve, an automatic electromagnetic means for periodically actuating said valve independently of the speed of actuation of said blade to intermittently supply fluid thereto, an electric circuit including a source of power, a continuously cyclically operating thermally responsive element having electric contacts arranged to control the flow of power from said source to said electromagnetic means, electric heating means for said element arranged to be energized from said source of power, and means settable to select and determine the heating time of said element to independently vary the time intervals during which the valve is closed and open.

6. The combination comprising a windshield wiper blade, means for operating the wiper blade, a source of fluid, a discharge controlling valve, and means for automatically, periodically actuating said valve to enable fluid to be supplied intermittently to said blade comprising a source of power, electromagnetic means for actuating said valve, a continuously cyclically operating thermally responsive element having electric contacts arranged to control the flow of power from said source to said electromagnetic means, electric heating means for said element arranged to be energized from said source of power, and means settable to select and determine the time intervals during which said heating means remains energized and deenergized.

7. In combination, a cyclical control system including circuit means and a source of power, and a work device controlled by said circuit means, said circuit means including a first thermally-responsive element, electrical contacts controlled and actuated by said element, an electrical heating unit for said element, spaced contacts at opposite sides of the element actuated contacts and engageable by the respective element actuated contacts, means responsive to the closing of one pair of engageable contacts to energize the heating unit, and to the closing of the other pair to deenergize the heating unit, means to maintain energization of said heating unit from the opening of the first pair of contacts until the closing of the second pair of contacts, the thermally-responsive element being movable to engage the first pair of contacts as it cools and to engage the second pair of contacts as it heats, so that it is caused to travel back and forth continuously and in timed relation through a definite path, further means included in the control circuit and cooperative with the control means for the heating unit to cause engagement of the respective pairs of engageable contacts to result in energization and deenergization of the work device, a second thermally-responsive element connected to the first thermally-responsive element for changing the temperature at which such first element will cause the first pair of contacts to become disengaged, an electrical heater associated with said second thermally-responsive element for distorting the latter, and an adjustable contact for controlling the rate at which heat is supplied to said last mentioned electrical heater.

8. In combination, a cyclical control system including circuit means and a source of power, and a work device controlled by said circuit means, said circuit means including a first thermally-responsive element, electrical contacts controlled and actuated by said element, an electrical heating unit for said element, spaced contacts at opposite sides of the element actuated contacts and engageable by the respective element actuated contacts, means responsive to the closing of one pair of engageable contacts to energize the heating unit, and to the closing of the other pair to deenergize the heating unit, means to maintain energization of said heating unit from the opening of the first pair of contacts until the closing of the second pair of contacts, the thermally-responsive element being movable to engage the first pair of contacts as it cools, and to engage the second pair of contacts as it heats, so that it is caused to travel back and forth continuously and in timed relation through a definite path, further means included in the control circuit and cooperative with the control means for the heating unit to cause engagement of the respective pairs of engageable contacts to result in energization and deenergization of the work device, a second thermally-responsive element rigidly connected to said first thermally-responsive element, means pivotally supporting the composite structure formed by said elements, an electrical heater associated with said second thermally-responsive element, and means for adjusting the heating rate of said last mentioned electrical heater, the second thermally-responsive element being constructed and arranged, as its temperature increases, to increase the temperature at which the first pair of contacts become disengaged.

9. Means adapted for use in conjunction with a windshield wiper apparatus for applying a fluid to the wiper of a windshield, comprising a discharge controlling valve, means for automatically periodically actuating the valve to enable a fluid to be supplied intermittently to the windshield comprising a source of power, electromagnetic means for actuating said valve, a continuously cyclically operating thermally responsive element having electric contacts arranged to control the flow of power from said source to said electromagnetic means, electric heating means for said element arranged to be energized from said source of power, and means settable to select and determine the time intervals during which said heating means remains energized and deenergized.

THEODORE J. SMULSKI.

REFERENCES CITED

The following references are of record in the file of this patent:

UNITED STATES PATENTS

| Number | Name | Date |
|---|---|---|
| 1,974,188 | Martin | Sept. 18, 1934 |
| 2,009,601 | Anderson | July 30, 1935 |
| 2,162,985 | West | June 20, 1939 |